E. SCHNEIDER.
APPARATUS FOR TRAINING GUNS MOUNTED ON WHEELED GUN CARRIAGES.
APPLICATION FILED FEB. 14, 1918.
1,341,385.
Patented May 25, 1920.
8 SHEETS—SHEET 1.
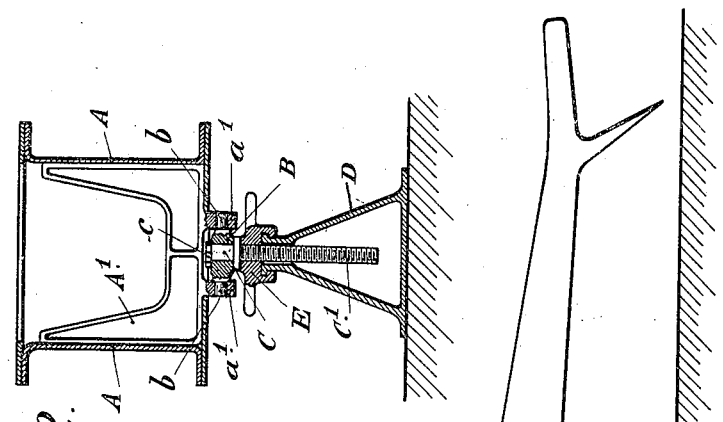
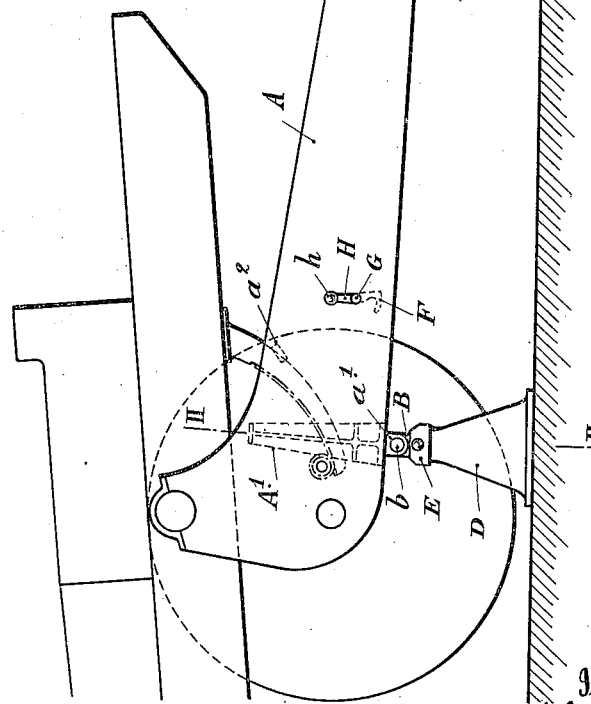

E. SCHNEIDER.
APPARATUS FOR TRAINING GUNS MOUNTED ON WHEELED GUN CARRIAGES.
APPLICATION FILED FEB. 14, 1918.
1,341,385.
Patented May 25, 1920.
8 SHEETS—SHEET 2.
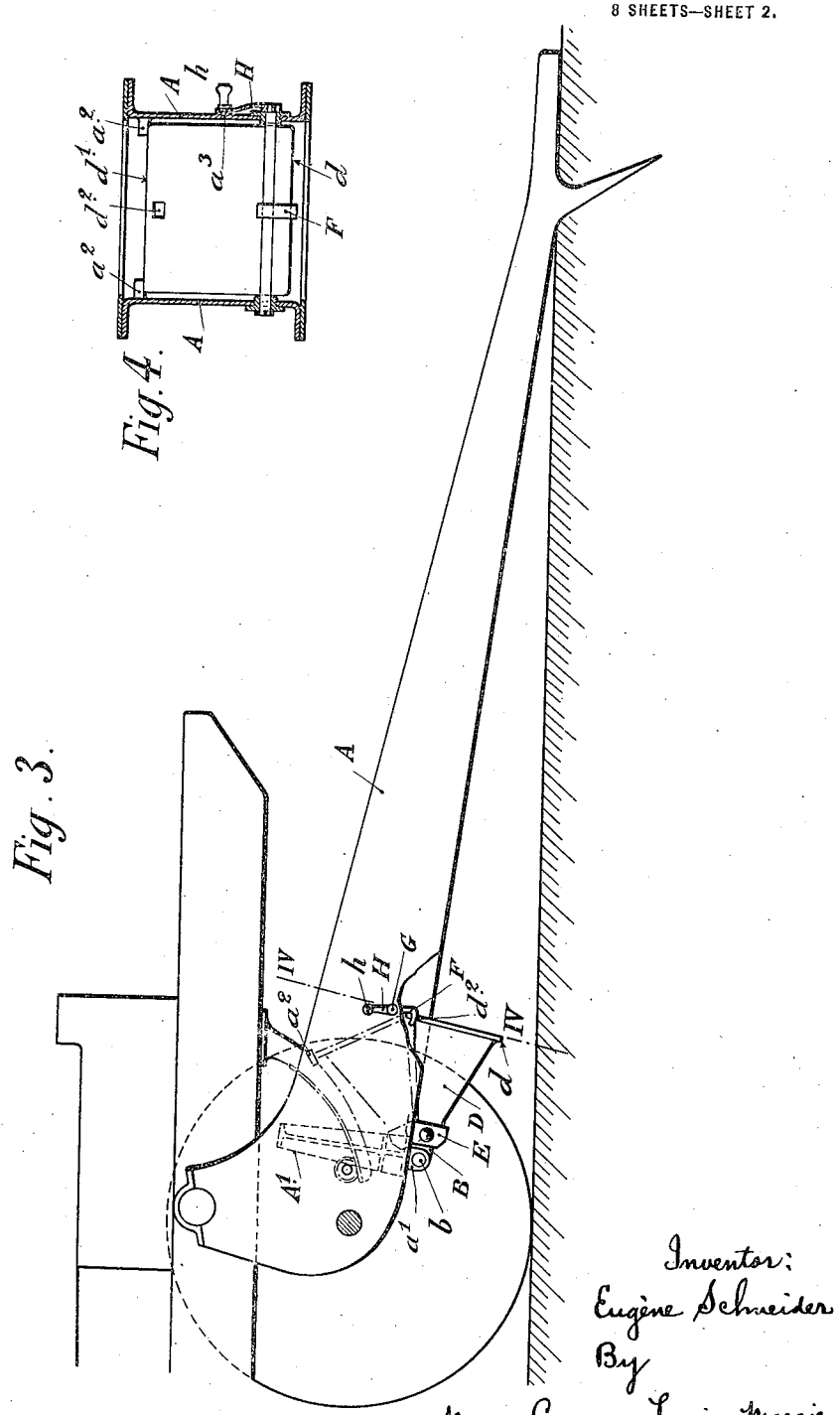

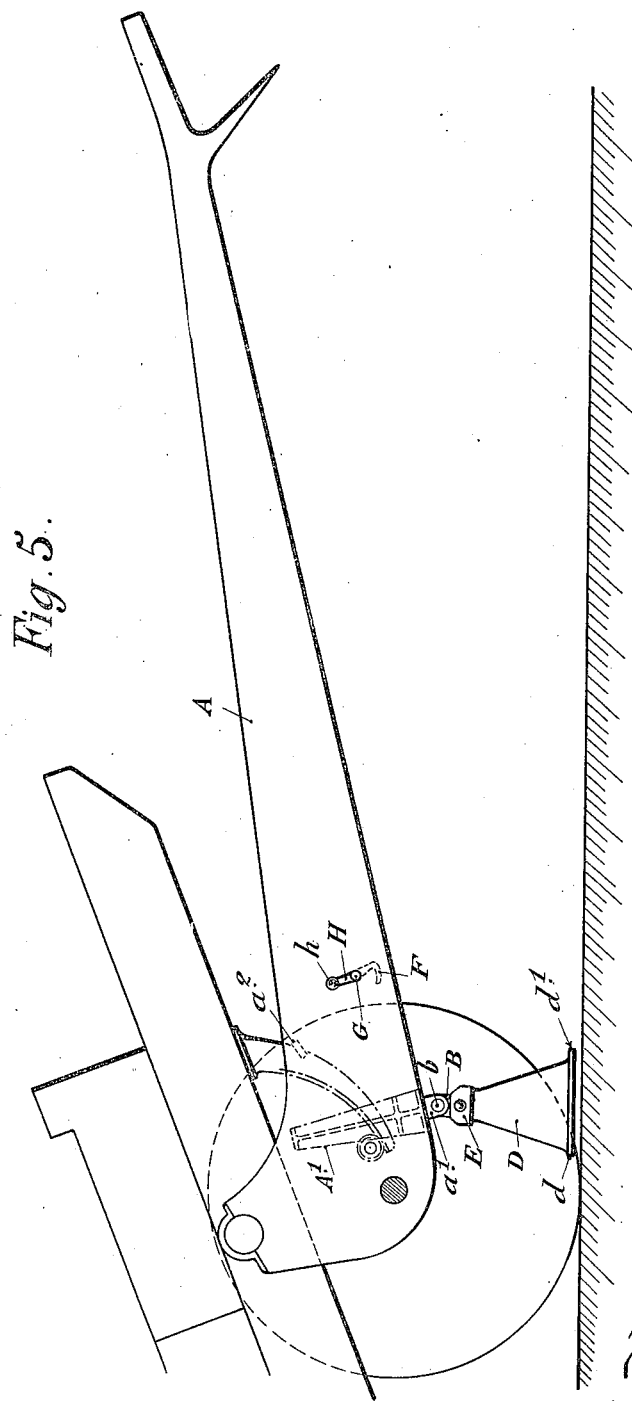

E. SCHNEIDER.
APPARATUS FOR TRAINING GUNS MOUNTED ON WHEELED GUN CARRIAGES.
APPLICATION FILED FEB. 14, 1918.

1,341,385.

Patented May 25, 1920.
8 SHEETS—SHEET 4.

Inventor:
Eugène Schneider
By
Mauro, Cameron, Lewis & Massie.
Attorneys.

E. SCHNEIDER.
APPARATUS FOR TRAINING GUNS MOUNTED ON WHEELED GUN CARRIAGES.
APPLICATION FILED FEB. 14, 1918.

1,341,385.  
Patented May 25, 1920.  
8 SHEETS—SHEET 5.

Inventor:  
Eugène Schneider  
By Mauro, Cameron, Lewis & Massie,  
Attorneys.

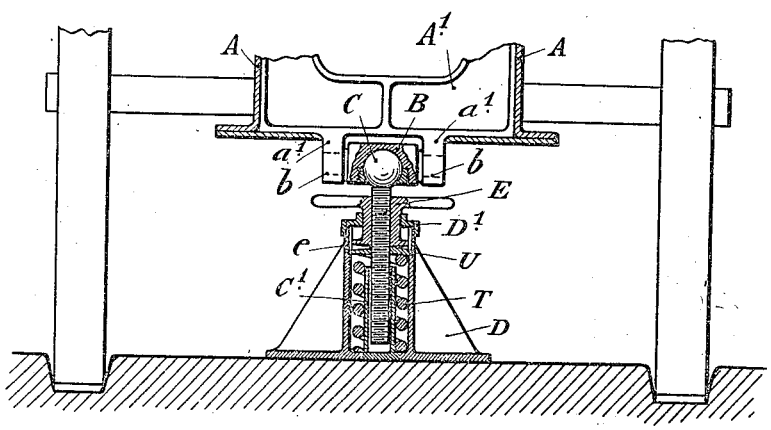
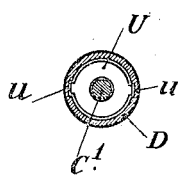

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR TRAINING GUNS MOUNTED ON WHEELED GUN-CARRIAGES.

1,341,385.     Specification of Letters Patent.     Patented May 25, 1920.

Application filed February 14, 1918. Serial No. 217,195.

*To all whom it may concern:*

Be it known that I, EUGÈNE SCHNEIDER, a citizen of the Republic of France, and a resident of 42 Rue d'Anjou, Paris, France, have invented new and useful Improvements in Apparatus for Training Guns Mounted on Wheeled Gun-Carriages, which invention is fully set forth in the following specification.

This invention has for its object to provide an improved apparatus, which may be partly removable if desired, which when applied to wheeled gun carriages enables said carriages to be trained by hand, with a minimum exertion of power, by acting upon the trails of said carriages.

According to this invention one of the elements of a pivotal connection (cup, pivot pin or annular bearing or spherical pivot member) pivotally attached to the underside of the gun carriage trail and located in the plane of the longitudinal axis of the latter and on a vertical line through the center of gravity of the gun and its carriage, or approximately in this position, is combined with the complementary element (spherical member, pivot pin or annular bearing, or cup) of the pivotal connection provided on the upper part of the supporting foot. This foot has a height such that the gun can be maintained completely or approximately in equilibrium upon it, and if desired entirely out of any direct contact with the ground. In this manner the trail can be raised without much effort to the desired level for enabling the gun carriage to be rotated horizontally. In practice, the foot combined with the carriage trail may be connected permanently to the latter and be kept raised in suitable positions respectively when transporting and when firing the gun. According to this invention also, the foot for the pivot may be constructed in the form of a mechanical or hydraulic jack.

Several embodiments of the invention are illustrated by way of examples in the accompanying drawings in which:—

Figures 1 to 5 illustrate a first embodiment.

Fig. 1 is an elevation of a gun carriage provided with the auxiliary apparatus, shown in a suitable position for training the gun.

Fig. 2 is a cross section on the line II—II of Fig. 1.

Fig. 3 is an elevation of the gun carriage in the firing position. The auxiliary apparatus is shown in full lines in a raised position in which it can be maintained during the whole of the firing operations; it is shown in dot and dash lines in the completely raised position for transport.

Fig. 4 is a cross section on the line IV—IV of Fig. 3, the pivotal foot being assumed to be raised in position for transport.

Fig. 5 is a side elevation of the gun carriage showing an intermediate position of the carriage and of the pivotal foot during the maneuver that is executed in order to bring the latter into the position shown in Figs. 1 and 2.

Fig. 6 is a partial diagrammatic elevation of the gun carriage, wherein the pivotal foot is shown in full lines in the firing position and in dot and dash lines in position for transport.

Fig. 7 is a cross section on a larger scale, showing the pivotal foot opened out for resting on the ground for the purpose of training the gun.

Fig. 8 is a corresponding side elevation.

Fig. 9 is a sectional elevation showing the pivotal foot folded for hooking up on to the carriage during firing or for transport.

Figs. 10 and 11 are partial views on a larger scale showing a detail of the folding foot in two different positions.

Fig. 12 is an elevation partly in section along the axis of the foot.

Fig. 13 is a partial section illustrating a detail.

Figs. 14, 15 and 16 are elevations partly in vertical cross section, showing another embodiment of the invention in three different positions of operation.

Fig. 17 is a section on the line XVII—XVII of Fig. 14.

Figure 6:
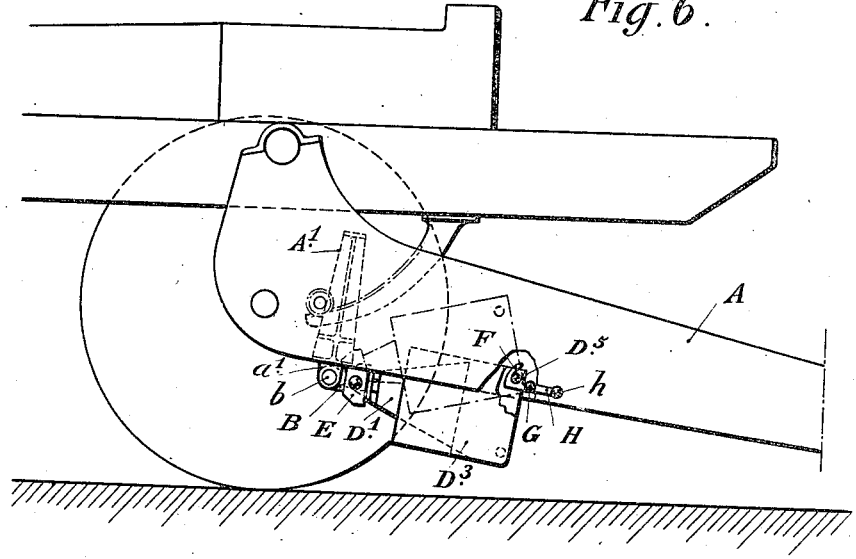
Figs. 6 to 11 illustrate a modification of the preceding embodiment, wherein the body of the pivotal foot is constructed in such a manner that it can be folded for the purpose of being raised and hooked up in the positions for firing and for transport.

In these various figures, A is the trail of a wheeled gun carriage of any suitable construction. The trail carries, substantially in the plane of its longitudinal axis and substantially on a vertical line through the center of gravity of the gun and its carriage, one of the elements B of a pivotal device having a vertical axis, the complementary element C of which is carried by a foot which may if desired be removable in part.

In the examples shown in Figs. 1 to 11, it is assumed that the pivot proper C of the pivotal device constitutes the head of the foot, while the pivotal element B carried by the trail is constituted by a bearing ring which may be retained on the pivot by means of a nut $c$.

In practice, the pivot C, instead of being rigidly fixed to the body D of the foot, may constitute one of the elements of a lifting jack. In the example shown in Figs. 1 to 5, the pivot C is formed with a screw $C^1$ working in a nut E that is able to rotate on the body D.

The whole pivotal foot C—E—D may be transported separately, but is preferably constructed to remain permanently connected to the trail. For this purpose the bearing ring B may be jointed to the trail by means of trunnions $b$ movable in lugs $a^1$ projecting from the underside of the trail A. These lugs may be formed in one piece with a stay $A^1$ which serves to connect together the sides A of the gun carriage trail.

A hooking or bolting device may be provided for keeping the pivotal foot raised and completely stowed away between the sides of the gun carriage trail in the position indicated by dot and dash lines in Fig. 3 and full lines in Fig. 4.

In the example shown, a hook F is fixed on a shaft G journaled in the sides A of the trail and is adapted to be actuated by means of a lever H the handle $h$ of which contains a spring bolt.

The hook F serves during transport to hold the edge $d$ of the base plate of the pivotal foot, while the opposite edge $d^1$ (Fig. 4) butts against two projections $a^2$ located on the trail sides A. The base plate is further pierced near the edge $d^1$ with a hole $d^2$ into which the hook can be engaged for the purpose of holding the pivotal foot in the intermediate position shown in full lines in Fig. 3.

The pivotal foot may be held in this position during firing, the hook being fixed both during firing as well as during transport, by the engagement of the bolt of the handle $h$ in a socket $a^3$ provided in the side of the carriage.

When it is desired to alter the training of the gun, a gun server lifts the trail into the position shown in Fig. 5, while another gun server by operating the lever H releases the pivotal foot which, turning on its trunnions $b$, moves down into the position shown in the same figure. The trail is then lowered into the position shown in Fig. 1, whereby the base plate of the foot D comes into contact with the ground and thus allows of raising the wheeled axle of the carriage. The whole gun then remains in equilibrium on the pivotal foot, the height of which is of course suitably chosen for this purpose.

In a case where, by reason of the configuration of the ground, the wheeled axle would be insufficiently lifted off the ground, it can be readily raised to the desired elevation by operating the nut E in the requisite direction. When the carriage has been brought into the desired position of training, a maneuver is executed in the reverse direction by bringing the trail from the position shown in Fig. 1 into the position shown in Fig. 5. If it be necessary the nut E of the lifting jack is operated in the reverse direction, then the foot is raised and hooked in the position shown in full lines in Fig. 3.

In the embodiment shown in Figs. 6 to 11, the body of the pivotal foot is constructed in such a manner as to be capable of being folded for the purpose of being raised and hooked in the positions for firing and for transport.

In this embodiment, the support proper D of the pivotal foot is adapted to fold. For this purpose it comprises a plurality of legs $D^1$ jointed at their upper ends to the head $D^2$ upon which the nut E is mounted. Two legs D' are here shown, for purposes of illustration, but it will be readily understood that more than two may be employed if desired. These legs are jointed at their lower ends each to a base plate $D^3$, the under surface of which may if desired be provided with ribs or corrugations. The legs $D^1$ are stayed by means of two links $D^4$ that are jointed together. When the base plates $D^3$ are folded on the legs $D^1$ for the purpose of folding the foot, they may be fastened in position by means of a latch $D^5$ jointed to one of them and having a hook $d^5$ engageable with a tenon $d^3$ carried by the other leg.

Figure 7:
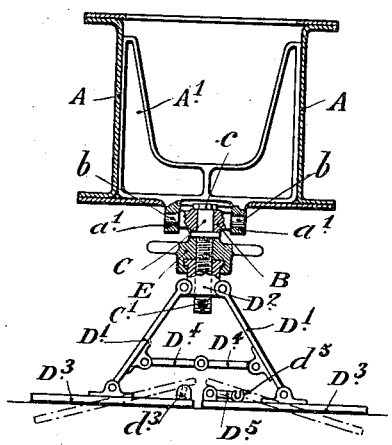
Figure 8:
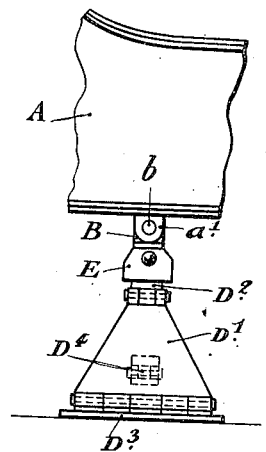
Figure 9:
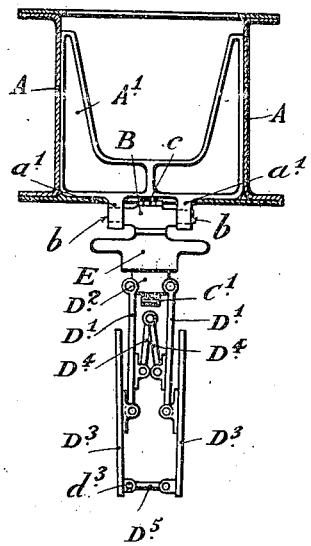
Figure 10:
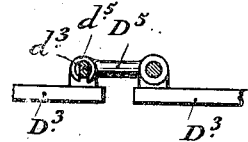

When it is desired to fold the foot, starting from the position shown in full lines in Fig. 7, the latch $D^5$ is turned down into the position shown in Fig. 10. The foot having then been suitably lifted off the ground, by pivotation on the axis of its trunnions $b$, the base plates $D^3$ are raised and folded against the legs $D^1$.

Figure 11:
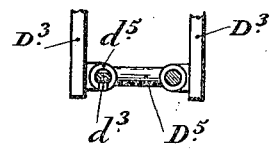

The tenon $d^3$ turns in the hook $d^5$ from which it cannot become disengaged as shown in Fig. 11.

A folding foot, such as the one just described, can provide the gun carriage with a support comprising a fairly large bearing area upon the ground. It is also to be understood that instead of the two legs $D^1$ each jointed to a separate base plate, any suitable number of such legs may be provided and the whole used as a pivotal tripod.

The base plate or base plates of the rigid foot or of the folding foot may, if desired, be anchored by suitable stakes or cramps.

Figure 12:
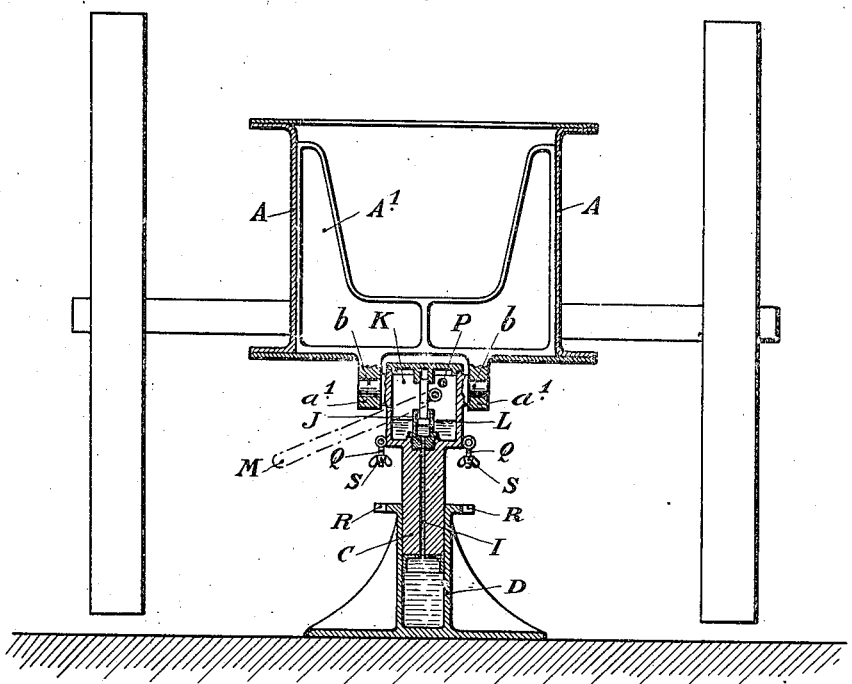
Figs. 12 and 13 show an embodiment wherein the element of the pivotal connection carried by the gun carriage trail is constructed in the form of a pivot pin for which a bearing is provided in the support proper, these two elements being also adapted to constitute, when assembled, a hydraulic jack.
Figure 13:
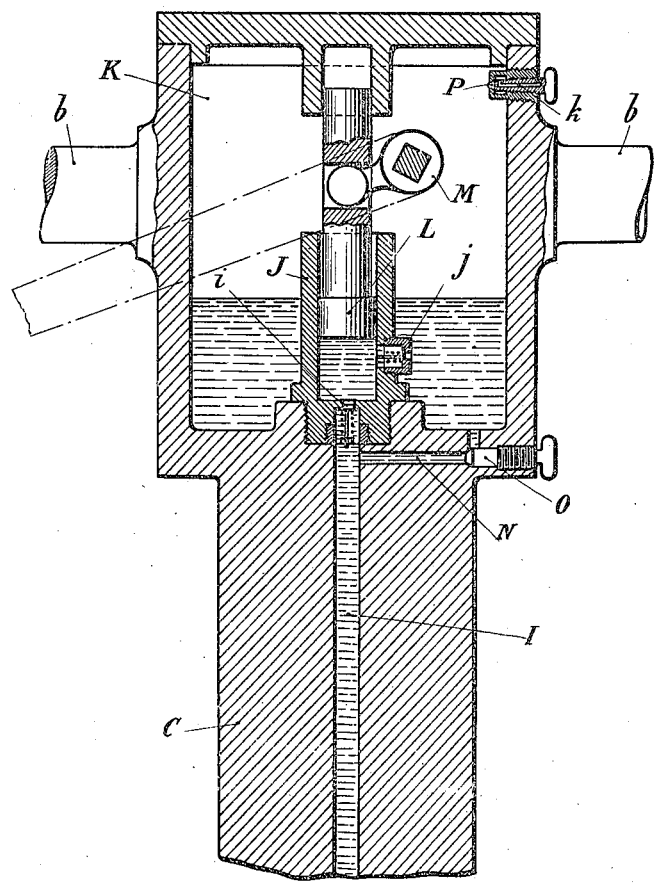

In the embodiment shown in Figs. 12 and 13 the element of the pivotal devices carried by the carriage trail is constructed in the form of a pivot for which a bearing is constituted by the foot, these two elements being also constructed to constitute together a hydraulic lifting jack.

In this embodiment the pivot C carries directly the trunnions $b$ that are movable in lugs $a^1$ provided on the underside of the stay of the trail.

This pivot forms a piston adapted to work in a cylindrical recess formed in the foot D.

This piston is pierced with an axial duct I which establishes communication between its lower face and a pump barrel J located in a chamber K formed in the upper part of the pivot piston. The communication between the duct I and the pump barrel J is controlled by a non-return valve $i$, (Fig. 13) while the pump barrel J communicates with the chamber K by way of a suction valve $j$. In the pump barrel is a piston L which may be operated by means of an actuating lever M. N is a branch duct provided with a shut off valve O; it constitutes a by-pass for establishing communication between the duct I and the chamber K. The upper portion of this chamber may be placed in communication with the external air by way of a duct $k$ which can be closed by means of a plug valve P. If, then, it be desired to raise the wheeled axle, liquid is pumped from the chamber K through the duct I into the space in the foot D beneath the pivot piston C. During this operation, valve O being closed, liquid is drawn into the barrel J through suction valve $j$ on the up-stroke of the piston L and forced from the barrel J into the duct I through the one-way valve $i$ during the down-stroke of the piston L.

For the purpose of raising the whole pivotal foot with respect to the trail, the pivot piston C may be fixed to the body D of the lifting jack by means of any suitable locking device, such for instance as links Q jointed to the lower part of the head of the lifting jack and adapted to engage with lugs R formed on the jack body D where they may be fixed by means of nuts S. To raise the whole pivotal foot with respect to the trail, assuming the parts to be in the position shown in Fig. 12, valve O is opened to establish communication between the duct I and chamber K, whereupon the weight of the gun will cause the pivot-piston C to lower with respect to the foot D, the liquid in the latter being forced through the ducts I and N into the chamber K, valve P being opened, if necessary, to prevent the formation of an excessive air pressure in the upper portion of chamber K. Thereupon links Q may be engaged with the lugs R to fix the foot D to the trail.

In the embodiment shown in Figs. 14, 15, 16 and 17, the nut E of the pivotal foot constructed in the form of a lifting jack, instead of bearing directly upon the foot D, bears against one end of a spring T located in said foot, the other end of this spring bearing against the bottom of the foot. The nut E is guided in a cap $D^1$ which forms a stop for the collar $e$. The bearing upon the spring may be effected through the intermediary of a washer U guided by two projections $u$ (Fig. 17) in slots in the foot D.

Figure 14:
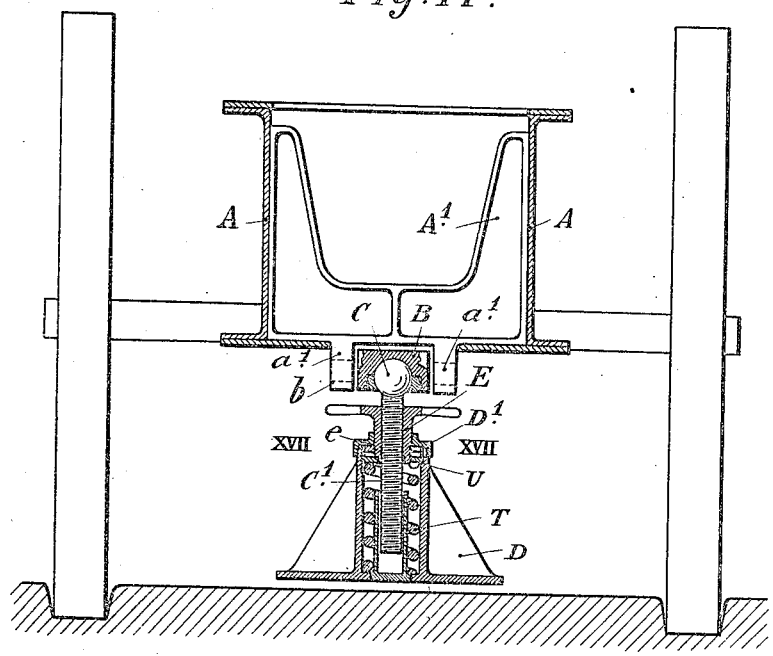

Normally, when the pivotal foot is suspended underneath the trail, the spring T has a tendency to move the foot D away from the nut E and the screw C′, the parts being then in the position shown in Fig. 14 where the collar $e$ of the nut butts against the cap $D^1$. The spring is arranged with an initial tension that is slightly smaller than the weight of the supported parts.

When it is desired to alter the training of the gun, first the trail is brought into the position shown in Fig. 5 to which Fig. 14 corresponds. Then the trail is lowered until the foot D comes in contact with the ground. From this moment onward, by allowing the foot to support the greater part of the weight of the parts, the spring T will be compressed and the pivot-screw C—$C^1$ and nut E will be caused to move down correspondingly as shown in Fig. 15. When the supported weight is balanced by the supplementary tension of the spring, the parts as a whole can be swung on the spherical pivot member C, in which case the wheels may remain slightly in contact with the ground.

Figure 16:
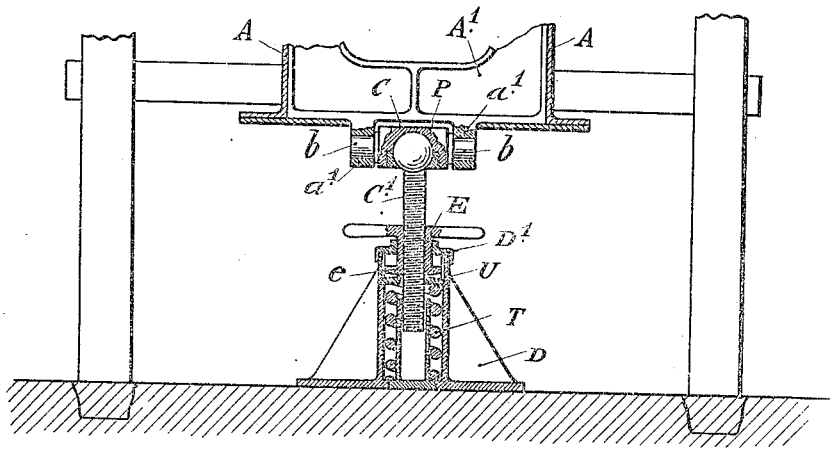

By operating the nut E it is always possible in case of necessity to lift the screw $C^1$, as shown in Fig. 16, for the purpose either of regulating the degree of contact which it is desired to maintain between the wheels and the ground or of maintaining the wheels completely raised off the ground.

If in the course of the training movement of the gun carriage the wheels should strike a prominence of the ground, they will readily overcome this obstacle, because the whole of the parts can rise relatively to the body D of the lifting jack, and the actual tension of the spring T will then balance almost wholly the weight of the gun.

The embodiment of the invention illustrated in Figs. 14 to 16 is generically but not specifically claimed herein, such specific construction forming the subject-matter of my divisional application Serial No. 279,872, filed Feb. 28, 1919.

What I claim is:—

1. In an apparatus for training a gun comprising a wheeled gun carriage, the combination with the gun carriage, of a foot adapted to rest upon the ground and constituting the fixed member of a lifting jack, the movable complementary member of the lifting jack including vertical and horizontal axes located substantially in vertical alinement with the carriage and carrying trunnions coincident with said horizontal axis, bearings for said trunnions on the carriage trail, and means for moving apart the fixed and complementary members of the lifting jack to support the gun and its carriage approximately in equilibrium so that the gun trail can be manually lifted and the gun trained.

2. In an apparatus for training a gun comprising a wheeled gun carriage, the combination with the gun carriage, of a foot adapted to rest upon the ground and constituting the fixed element of a lifting jack, the movable element of said lifting jack providing one member of a pivotal connection having a vertical axis, means for actuating said movable element by hand, horizontal trunnions carried by said movable element, bearings for said horizontal trunnions on the carriage trail, and a holding device on the carriage trail, whereby said foot can be swung on said horizontal trunnions up into a position against the carriage trail in which it can be held by said holding device for transport.

3. In an apparatus for training a gun comprising a wheeled gun carriage, the combination with the gun carriage, of a foot adapted to rest upon the ground and constituting the cylinder of a hydraulic lifting jack, the cylinder of said lifting jack having its upper part formed as one member of a pivotal connection having a vertical axis, means for actuating said jack by hand, the piston of said lifting jack constituting the coöperating member of said pivotal connection, horizontal trunnions on said coöperating member, and bearings for said horizontal trunnions on the carriage trail.

4. In an apparatus for training a gun comprising a wheeled gun carriage, the combination with the gun carriage, of a foot adapted to rest on the ground, a horizontal pivotal connection between said foot and the gun carriage located substantially in vertical alinement with the center of gravity of the gun and its carriage, the connection between said foot and the gun carriage being constructed to constitute a hydraulic jack, and means for operating said jack.

5. In an apparatus for training a gun comprising a wheeled gun carriage, the combination with the gun carriage, of a foot adapted to rest on the ground, an element of a vertical pivot carried by said foot, and a complementary pivotal element pivotally connected to the gun carriage trail, said pivotal elements being constructed to also provide a hydraulic jack in the connections between said foot and the gun carriage trail.

6. In an apparatus for training a gun comprising a wheeled gun carriage, the combination with the gun carriage, of a foot adapted to rest on the ground and constituting the fixed element of a hydraulic jack, the movable and fixed elements of said jack being formed as the members of a pivotal connection having a vertical axis, horizontal trunnions on the movable member of said pivotal connection, and bearings for said trunnions on the gun carriage trail.

7. In an apparatus for training a gun comprising a wheeled gun carriage, the combination with the gun carriage, of a foot adapted to rest on the ground and constituting the fixed element of a hydraulic jack, the movable and fixed elements of said jack being formed as the members of a pivotal connection having a vertical axis, horizontal trunnions on the movable member of said pivotal connection, bearings for said trunnions on the gun carriage trail, and means on the gun carriage for holding said foot out of contact with the ground.

8. In an apparatus for training a gun comprising a wheeled gun carriage, the combination with the gun carriage, of a foot adapted to rest on the ground and connected to the gun carriage trail, said foot constituting the fixed element of a hydraulic jack and the movable element of said jack coacting therewith to provide a pivotal connection having a vertical axis, and manual means for operating said jack.

9. In an apparatus for training a gun comprising a wheeled gun carriage, the combination with the gun carriage, of a foot adapted to rest on the ground and constituting the cylinder of a hydraulic jack, the piston of said jack coacting therewith to provide a pivotal connection having a vertical axis, horizontal trunnions on the piston of the hydraulic jack, bearings for said trunnions on the gun carriage trail, and manual means for operating said jack.

10. In an apparatus for training a gun comprising a wheeled gun carriage, the combination with the gun carriage, of a foot adapted to rest on the ground and connected to the gun carriage trail, said foot constituting the cylinder of a hydraulic jack and the piston of said jack coacting therewith to provide a pivotal connection having a vertical axis, a pump for operating said jack, and a valve-controlled duct constituting a by-pass around said pump.

11. In an apparatus for training a gun comprising a wheeled gun carriage, the combination with the gun carriage, of a foot adapted to rest on the ground, said foot constituting the fixed element of a hydraulic jack, the movable element of said jack being connected to said carriage and coacting with said fixed element to provide a vertical pivot for said carriage, and means for operating said jack.

In testimony whereof I have signed this specification.

EUGÈNE SCHNEIDER.

Witnesses:
 ANDRÉ MOSTICKER,
 CHAS. P. PRESSLY.